(12) United States Patent
Suzuki

(10) Patent No.: US 10,803,263 B2
(45) Date of Patent: Oct. 13, 2020

(54) WIRELESS TAG READING APPARATUS AND METHOD

(71) Applicant: TOSHIBA TEC KABUSHIKI KAISHA, Shinagawa-ku, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/213,483

(22) Filed: Dec. 7, 2018

(65) Prior Publication Data

US 2019/0180063 A1 Jun. 13, 2019

(30) Foreign Application Priority Data

Dec. 13, 2017 (JP) ................... 2017-239034

(51) Int. Cl.
*G06K 7/10* (2006.01)
*G06Q 20/20* (2012.01)
*G06K 19/07* (2006.01)
*G01S 13/84* (2006.01)

(52) U.S. Cl.
CPC .......... *G06K 7/10366* (2013.01); *G01S 13/84* (2013.01); *G06K 7/10009* (2013.01); *G06K 19/0723* (2013.01); *G06Q 20/208* (2013.01)

(58) Field of Classification Search
None
See application file for complete search history.

(56) References Cited

U.S. PATENT DOCUMENTS

| 8,482,387 | B2 | 7/2013 | Iwahashi | |
| 8,686,857 | B2* | 4/2014 | Harada | B01L 3/5453 340/572.1 |
| 8,994,504 | B1* | 3/2015 | Schatz | G06K 7/10009 340/10.1 |
| 9,858,769 | B2* | 1/2018 | Hattori | G07G 1/009 |
| 10,185,852 | B2* | 1/2019 | Yaginuma | G06K 7/10316 |

(Continued)

FOREIGN PATENT DOCUMENTS

EP 2 779 020 A2 9/2014
WO WO-2017/064987 A1 4/2017

OTHER PUBLICATIONS

Search Report dated May 17, 2019 received in corresponding European application No. 18 21 1916.4, 12 pages.

*Primary Examiner* — Christle I Marshall
(74) *Attorney, Agent, or Firm* — Foley & Lardner LLP

(57) ABSTRACT

A wireless tag reading apparatus includes an input control means, an extraction means, a storage control means, and a determination means. The input control means receives an input of a signal obtained by converting the radio wave received by an antenna that receives a radio wave from a wireless tag. The extraction means extracts the phase of the radio wave received by the antenna from the signal received by the input control means. The storage control means causes the storage medium to store the phase of the radio waves extracted by the extraction means for each reception position at which the antenna received the radio waves. The determination means determines whether the wireless tag that transmitted the radio wave is inside a predetermined region based on the amount of change of phase stored in the storage medium.

20 Claims, 12 Drawing Sheets

(56) References Cited

U.S. PATENT DOCUMENTS

| | | |
|---|---|---|
| 2005/0206555 A1 | 9/2005 | Bridgelall et al. |
| 2009/0195358 A1* | 8/2009 | Vennelakanti ..... G06K 7/10336 340/10.1 |
| 2014/0253294 A1* | 9/2014 | Jones ................ G06K 7/10217 340/10.3 |
| 2018/0003812 A1* | 1/2018 | Kamiya .................. G06K 7/10 |
| 2018/0039801 A1* | 2/2018 | Suzuki ............... G06K 7/10316 |
| 2018/0053022 A1* | 2/2018 | Murofushi ......... G06K 7/10089 |
| 2020/0104555 A1* | 4/2020 | Kishimoto ......... G06K 7/10366 |

\* cited by examiner

| COMMODITY CODE | POSITION INFORMATION | PHASE INFORMATION |
|---|---|---|
| COMMODITY CODE A | 10 | 100 |
| COMMODITY CODE B | 18 | 150 |
| COMMODITY CODE A | 20 | 140 |
| COMMODITY CODE A | 27 | 152 |
| COMMODITY CODE B | 28 | 155 |
| ⋮ | ⋮ | ⋮ |

WIRELESS TAG READING APPARATUS AND METHOD

CROSS-REFERENCE TO RELATED APPLICATION

This application is based upon and claims the benefit of priority from Japanese Patent Application No. 2017-239034, filed on Dec. 13, 2017, the entire contents of which are incorporated herein by reference.

FIELD

Embodiments described herein relate to a wireless tag reading apparatus and a wireless tag reading method.

BACKGROUND

In related art, a technique for reading information of goods placed in a predetermined region from a wireless tag such as a radio frequency identification (RFID) tag attached to the goods is disclosed.

In such a technique, in order to prevent information from being read from a wireless tag attached to goods placed outside a predetermined region, a received signal strength indicator (RSSI) value of a radio wave to be transmitted for reading a wireless tag is adjusted. Thus, by requiring a threshold RSSI value, the wireless tag reading apparatus determines that it reads from the wireless tag inside the predetermined region.

In some situations, the radio wave may be influenced by the goods, resulting in deteriorated reading accuracy of the wireless tag reading apparatus, for example, when the goods are arranged in stacks, or when the goods are made of metal. Therefore, a method for improving the reading accuracy is to increase the RSSI threshold value for the wireless tags.

However, when the RSSI value is increased, the wireless tag reading apparatus sometimes reads information from the wireless tag located outside the predetermined region. Therefore, it is necessary for the wireless tag reading apparatus to determine whether information is from the wireless tag inside the predetermined region.

DETAILED DESCRIPTION

In an example embodiment disclosed herein, a wireless tag reading apparatus and a wireless tag reading method are capable of determining whether read information is information read from a wireless tag inside the predetermined region and not information from another wireless tag outside the predetermined region.

A wireless tag reading apparatus according to one embodiment includes input control means, extraction means, storage control means, and determination means. The input control means receives an input of a signal obtained by converting radio wave received by an antenna which receives a radio wave from a wireless tag. The extraction means extracts a phase of the radio wave received by the antenna from the signal received by the input control means. The storage control means causes the storage medium to store the phase of the radio wave extracted by the extraction means for each reception position at which the antenna receives the radio wave. The determination means determines whether the wireless tag that transmits the radio wave is inside a predetermined region based on an amount of change of the phase stored in the storage medium.

Embodiments of a wireless tag reading apparatus and a wireless tag reading method will be described in detail below with reference to the accompanying drawings. In addition, the embodiments described below are one embodiment of the wireless tag reading apparatus and the wireless tag reading method, and do not limit the configuration, specifications, and the like thereof. The wireless tag reading apparatus and the wireless tag reading method according to an exemplary embodiment is an example of the wireless tag reading apparatus applied to a commodity registration system that performs commodity registration by reading a wireless tag attached to a commodity.

First Embodiment

Figure 1:
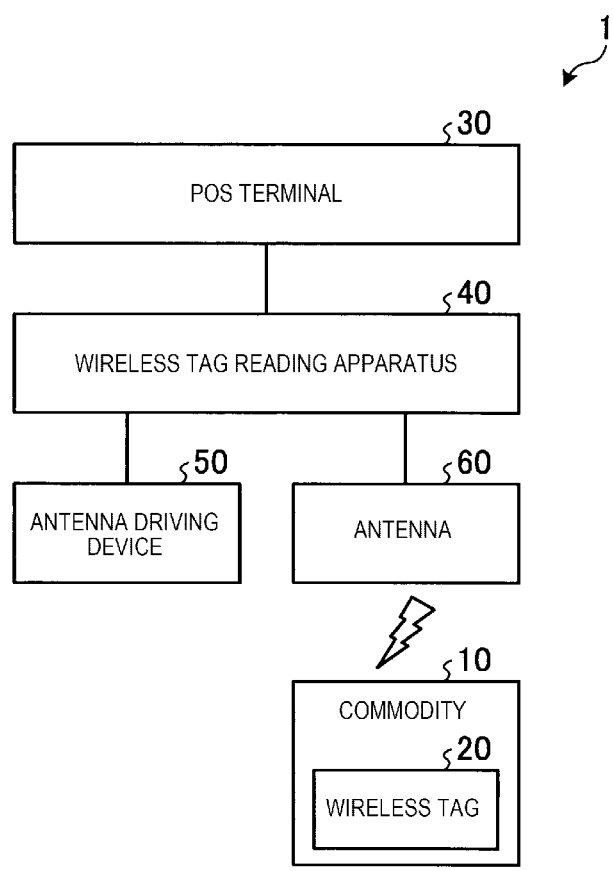
FIG. 1 is a diagram for explaining an example of a commodity registration system according to a first embodiment.

FIG. 1 is a diagram for explaining an example of a commodity registration system 1 according to a first embodiment. The commodity registration system 1 is a system that reads various information from a wireless tag 20 attached to a commodity 10. The commodity registration system 1 includes a Point of Sales (POS) terminal 30, a wireless tag reading apparatus 40, an antenna driving device 50, and an antenna 60.

The wireless tag 20 is an electronic tag, an IC tag, an RFID tag, an RF tag, or the like, for example. The wireless tag 20 transmits and receives information stored in a storage medium of the wireless tag 20 by near field wireless communication. For example, the wireless tag 20 stores tag information in the storage medium. The tag information is, for example, information such as a commodity code capable of identifying the commodity 10 to which the wireless tag 20 is attached. When receiving a radio wave for reading the information stored in the storage medium, the wireless tag 20 transmits a commodity code or the like stored in a storage medium.

The antenna 60 is a device configured to transmit and receive the radio waves for reading the wireless tag 20. When receiving the radio wave, the antenna 60 converts the radio wave into electric signal and outputs the electric signal. That is, the antenna 60 converts the radio wave into the analog signal and outputs the analog signal to the wireless tag reading apparatus 40.

The antenna driving device 50 is configured to drive the antenna 60 to cause the antenna 60 to read the wireless tag 20 from a plurality of positions. The antenna driving device 50 improves the reading accuracy of reading the wireless tag 20 by causing the antenna 60 to read the wireless tag 20 from a plurality of positions.

The wireless tag reading apparatus 40 controls the antenna driving device 50 and the antenna 60 to read the commodity code from the wireless tag 20. The wireless tag reading apparatus 40 causes the antenna 60 to read the wireless tag 20 while causing the antenna driving device 50 to move the antenna 60. When the antenna 60 receives the commodity code from the wireless tag 20, the wireless tag reading apparatus 40 stores the commodity code received from the wireless tag 20, along with a reception position of the antenna 60 at the time of receiving the commodity code, and a phase of the radio wave carrying the commodity code. When completing reading the wireless tag 20, the wireless tag reading apparatus 40 extracts the commodity code read from the wireless tag 20 inside the predetermined region based on the stored various pieces of information. Then, the wireless tag reading apparatus 40 transmits the extracted commodity code to the POS terminal 30.

The POS terminal 30 is a sales data processing device in which the wireless tag reading apparatus 40 performs commodity registration process for registering a commodity 10 to be sold, on the basis of the commodity code transmitted from the wireless tag 20. In addition, the POS terminal 30 may perform an accounting process of the commodity 10 registered by the commodity registration process. In addition, the POS terminal 30 may be a self terminal or a semi-self terminal. By the "self terminal", it refers to a device with which a customer himself or herself performs both the commodity registration process and the accounting process. By the "semi-self terminal", it refers to a registration device of a system in which the commodity registration process is performed by a registration device operated by a store clerk and the accounting process of the commodity 10 registered by the commodity registration process is performed by an accounting device operated by a customer.

Next, the antenna driving device 50 of the commodity registration system 1 and the antenna 60 according to the first embodiment will be described.

Figure 2:
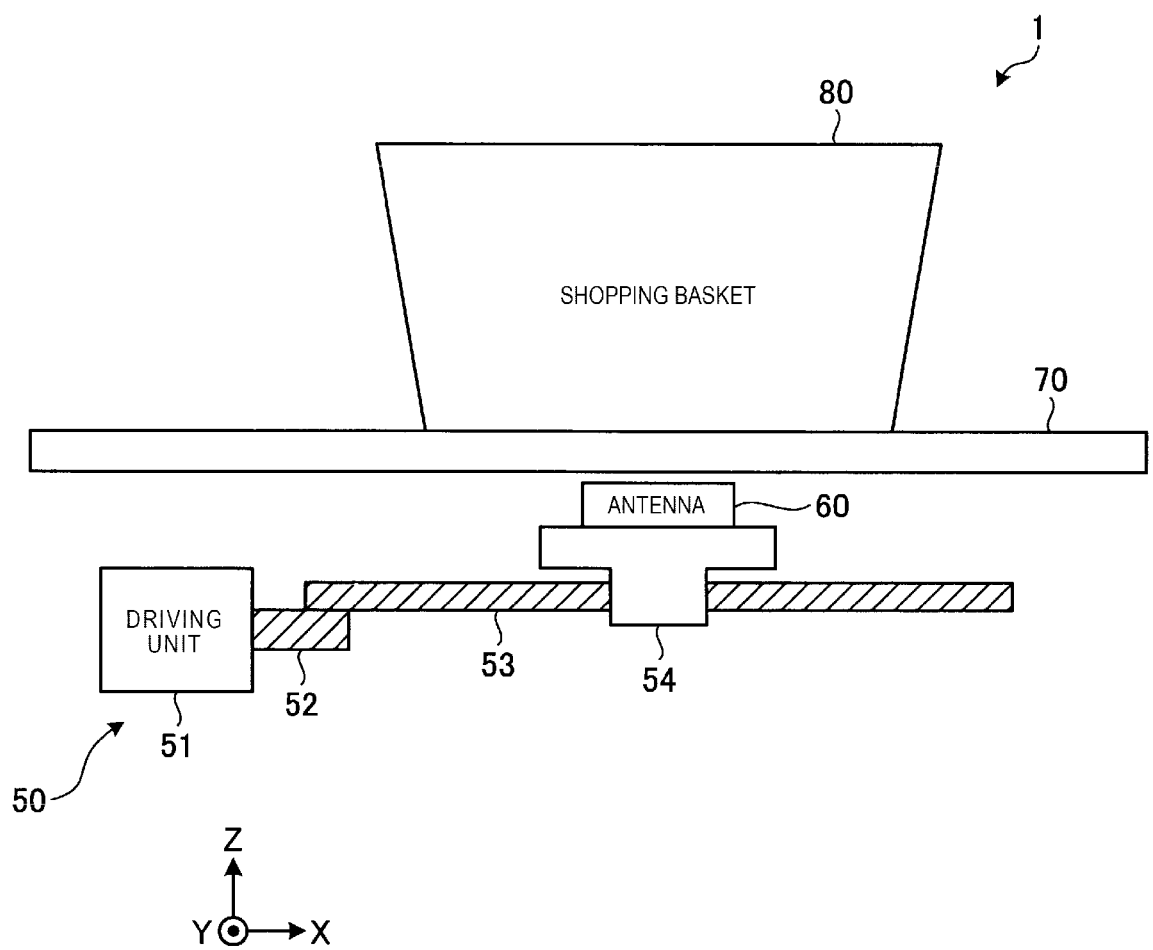
FIG. 2 is a diagram for explaining an example of an appearance configuration of an antenna driving device and an antenna.

FIG. 2 is a diagram for explaining an example of an appearance configuration of the antenna driving device 50 and the antenna 60. The antenna driving device 50 and the antenna 60 are disposed under a counter table 70 on which a shopping basket 80 or the like containing the commodity 10 attached with the wireless tag 20 is placed, for example.

The antenna driving device 50 includes a driving unit 51. The driving unit 51 includes, for example, a stepping motor. The driving unit 51 further includes a rotating shaft 52 that transfers rotational driving force to realize a linear motion. A screw thread is formed on the rotating shaft 52. In addition, the rotating shaft 52 is connected to a rail 53. Therefore, the rotating shaft 52 rotates the rail 53 when the driving unit 51 is rotationally driven. In other embodiments, equivalent linear actuators may be used in the driving unit 51. A moving stage 54 loaded with the antenna 60 is provided to the rail 53. The moving stage 54 is provided with a ball screw nut. The moving stage 54 moves in a horizontal direction when the rail 53 is rotated by the ball screw nut. That is, the moving stage 54 moves in the X-axis direction shown in FIG. 2. In addition, the moving stage 54 moves in the opposite direction when the rotational direction of the rail 53 is changed. In this way, the antenna driving device 50 causes the antenna 60 to reciprocate one or more times on the rail 53.

Here, the POS terminal 30 registers the commodity 10 of the commodity code read by the wireless tag reading apparatus 40 from the wireless tag 20 as the target commodity 10 to be sold. Therefore, the wireless tag reading apparatus 40 needs to exclude, among the commodity codes read from the wireless tags 20, the commodity code read from the wireless tag 20 attached to the commodity 10 which is not the target commodity from the commodity codes for transmission. The target commodity 10 to be sold is placed inside a predetermined region such as inside of the shopping basket 80, on top of the antenna 60 of the counter table 70, or the like. Therefore, the wireless tag reading apparatus 40 determines that the target commodity 10 inside the predetermined region is the target commodity 10 to be sold. On the other hand, the wireless tag reading apparatus 40 determines that the commodity 10 located outside the predetermined region is not the target commodity 10 to be sold.

Figure 3:
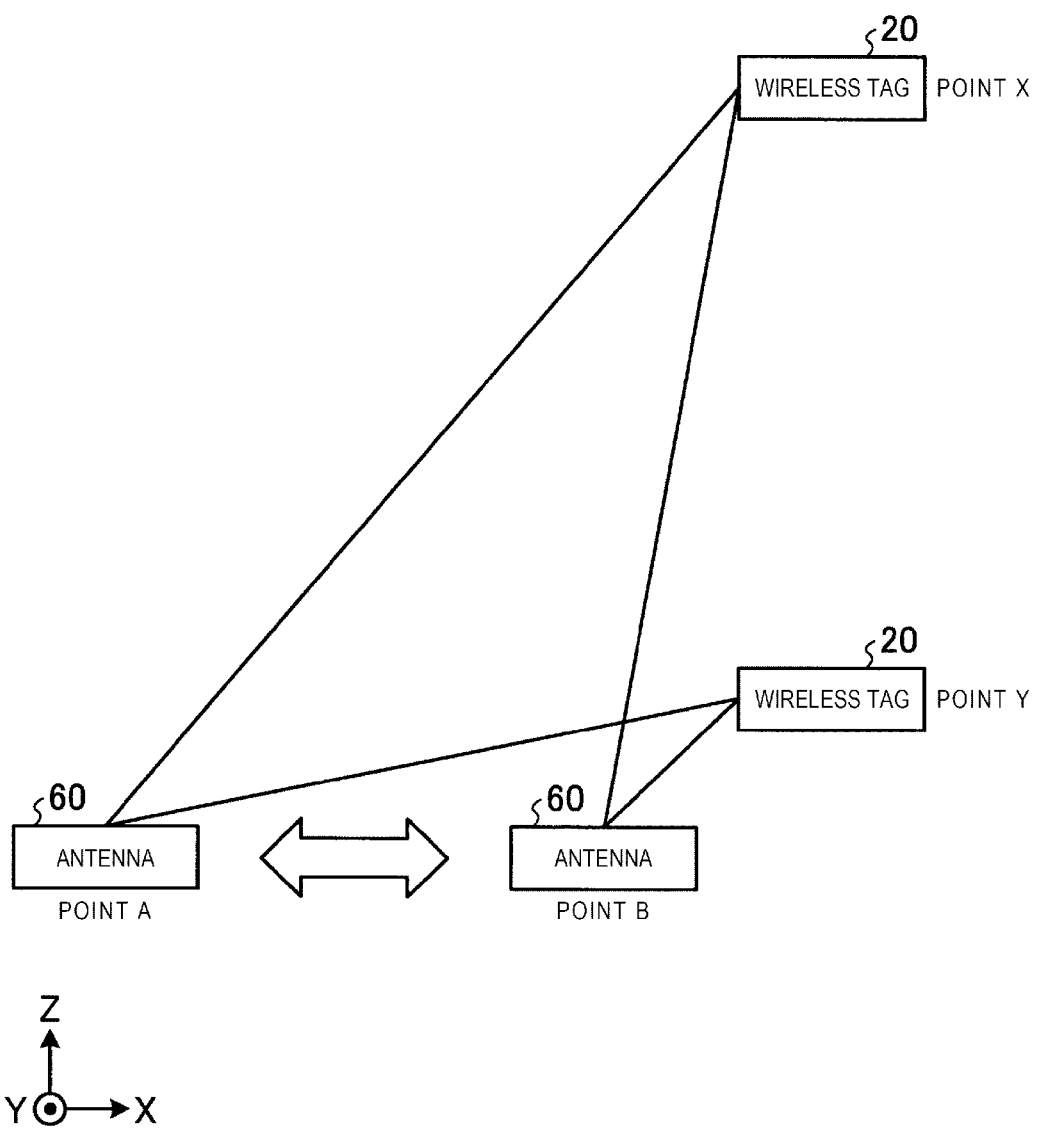
FIG. 3 is a diagram for explaining a phase change due to movement of an antenna.

The wireless tag reading apparatus 40 determines whether the positioning of the commodity is inside the predetermined region based on an amount of change of the phase of the radio wave carrying the commodity code transmitted by the wireless tag 20. Here, FIG. 3 is a diagram for explaining the phase change due to the movement of the antenna 60. When the antenna driving device 50 moves the antenna 60, the shorter the distance from the antenna 60 to the wireless tag 20 becomes, the greater the amount of change of the distance from the antenna 60 to the wireless tag 20 becomes. For example, in FIG. 3, the amount of change of the distance from point A to point Y and the distance from point B to point Y is greater than the amount of change of the distance from point A to point X and the distance from point B to point X.

For the same reason, under a condition that the position of the wireless tag 20 does not change, the shorter the distance from the antenna 60 to the wireless tag 20 becomes, the greater the amount of change of the phase of the radio wave received from the wireless tag 20 becomes. Therefore, the wireless tag reading apparatus 40 reads the wireless tag 20 while the antenna driving device 50 moves the antenna 60. When the same commodity code is read from two or more points, the wireless tag reading apparatus 40 compares the phases at the time of reading at each point. Then, the wireless tag reading apparatus 40 determines that the position of the wireless tag 20 is inside the predetermined region under a condition that the amount of change of the phase is equal to or greater than a threshold value.

More specifically, when the antenna 60 receives the commodity code from the wireless tag 20, the wireless tag reading apparatus 40 correlatively stores the commodity code, the phase of the radio wave that carried the commodity code, and the reception position of the antenna 60 at the time of receiving the commodity code. The wireless tag reading apparatus 40 compares the phases correlated with the same commodity code received at different reception positions. When the amount of change of the phase per displacement distance due to the displacement of the reception position is equal to or greater than the threshold value, the wireless tag reading apparatus 40 determines that the wireless tag 20 that transmits the commodity code is inside the predetermined region. On the other hand, the wireless tag reading apparatus 40 determines that the wireless tag 20 that transmits the commodity code is outside the predetermined region when the amount of change of the phase per displacement distance is less than the threshold value.

Next, the hardware configuration of each of the devices of the commodity registration system 1 will be described.

Figure 4:
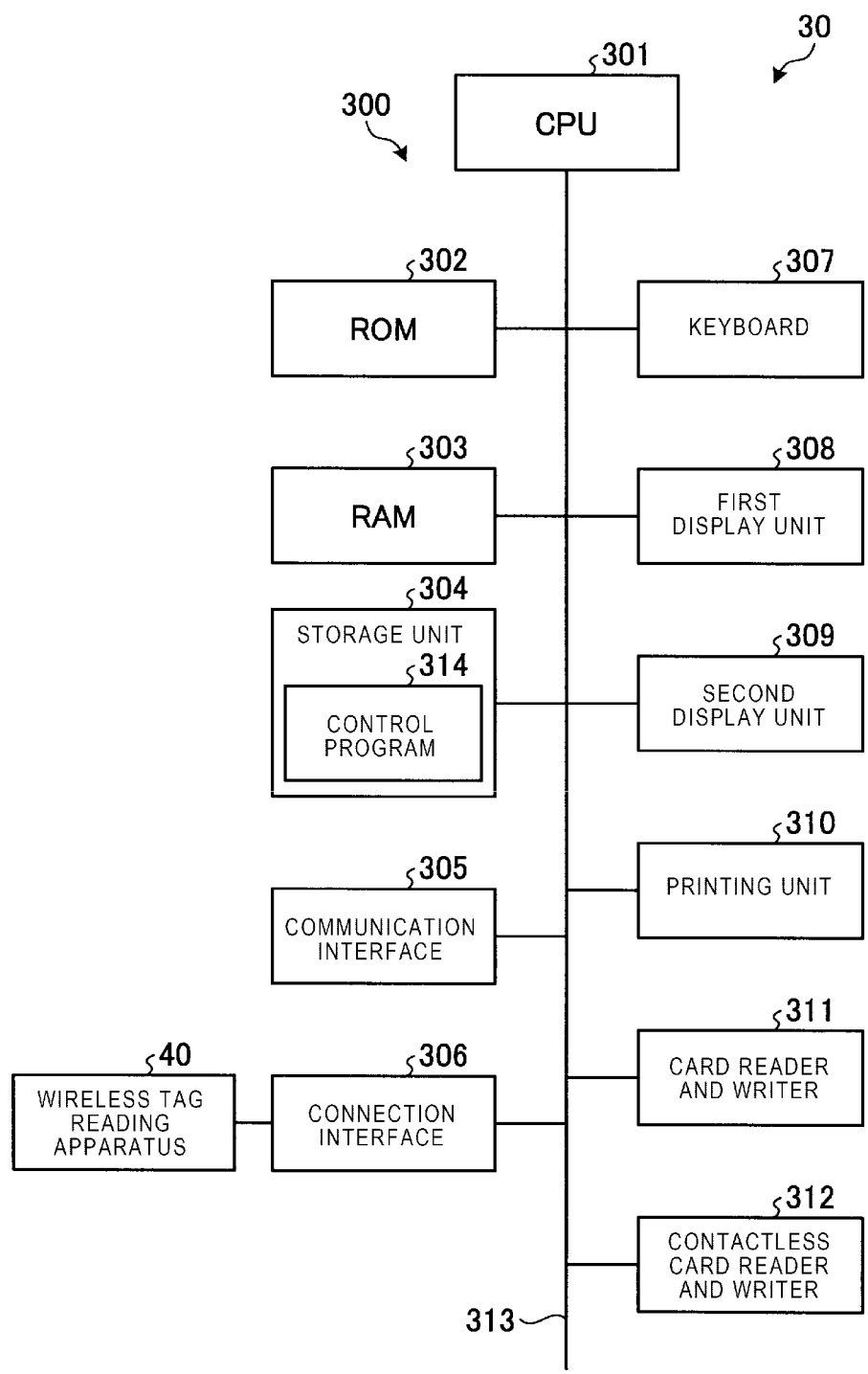
FIG. 4 is a block diagram illustrating an example of a hardware configuration of a POS terminal.

FIG. 4 is a block diagram illustrating an example of a hardware configuration of the POS terminal 30. The POS terminal 30 includes a control unit 300, a storage unit 304, a communication interface 305, a connection interface 306, a keyboard 307, a first display unit 308, a second display unit 309, a printing unit 310, a card reader and writer 311, and a contactless card reader and writer 312. These units are interconnected through a system bus 313 such as a data bus, an address bus, or the like.

The control unit 300 is a computer that controls the overall operation of the POS terminal 30 and implements various functions included in the POS terminal 30. The control unit 300 includes a central processing unit (CPU) 301, a read only memory (ROM) 302, and a random access memory (RAM) 303. The CPU 301 comprehensively controls the operation of the POS terminal 30. The ROM 302 is a storage medium for storing various wireless tag reading methods and data. The RAM 303 is a storage medium for temporarily storing various wireless tag reading methods and various data. Then, the CPU 301 executes the wireless tag reading method stored in the ROM 302 or the storage unit 304 or the like, while the RAM 303 serves as a work area.

The storage unit 304 is a storage device such as a Hard Disk Drive (HDD) or a Solid State Drive (SSD). The storage unit 304 stores a control wireless tag reading method 314. The control wireless tag reading method 314 is a wireless tag reading method for fulfilling the functions of the operating system and the POS terminal 30. The control wireless tag reading method 314 includes a wireless tag reading method for fulfilling the characteristic functions according to an exemplary embodiment.

The communication interface 305 is configured for communicating with various devices connected to the network. The connection interface 306 is configured for communicating with the wireless tag reading apparatus 40.

The keyboard 307 includes various keys for operating the POS terminal 30.

The first display unit 308 is a liquid crystal display device or the like having a touch panel stacked on a display surface. For example, the first display unit 308 displays various screens to a clerk of a shop. The second display unit 309 is a liquid crystal display device or the like having a touch panel stacked on the display surface. The second display unit 309, for example, displays various screens to a customer.

The printing unit 310 is a printer that prints receipts or the like showing transaction details, point status, or the like on paper. The card reader and writer 311 is an apparatus that performs writing and read information stored in a storage medium such as a magnetic material attached to a card. The contactless card reader and writer 312 performs writing and reading of information to or from the IC tag of the contactless IC card by near field communication (NFC) or the like.

Figure 5:
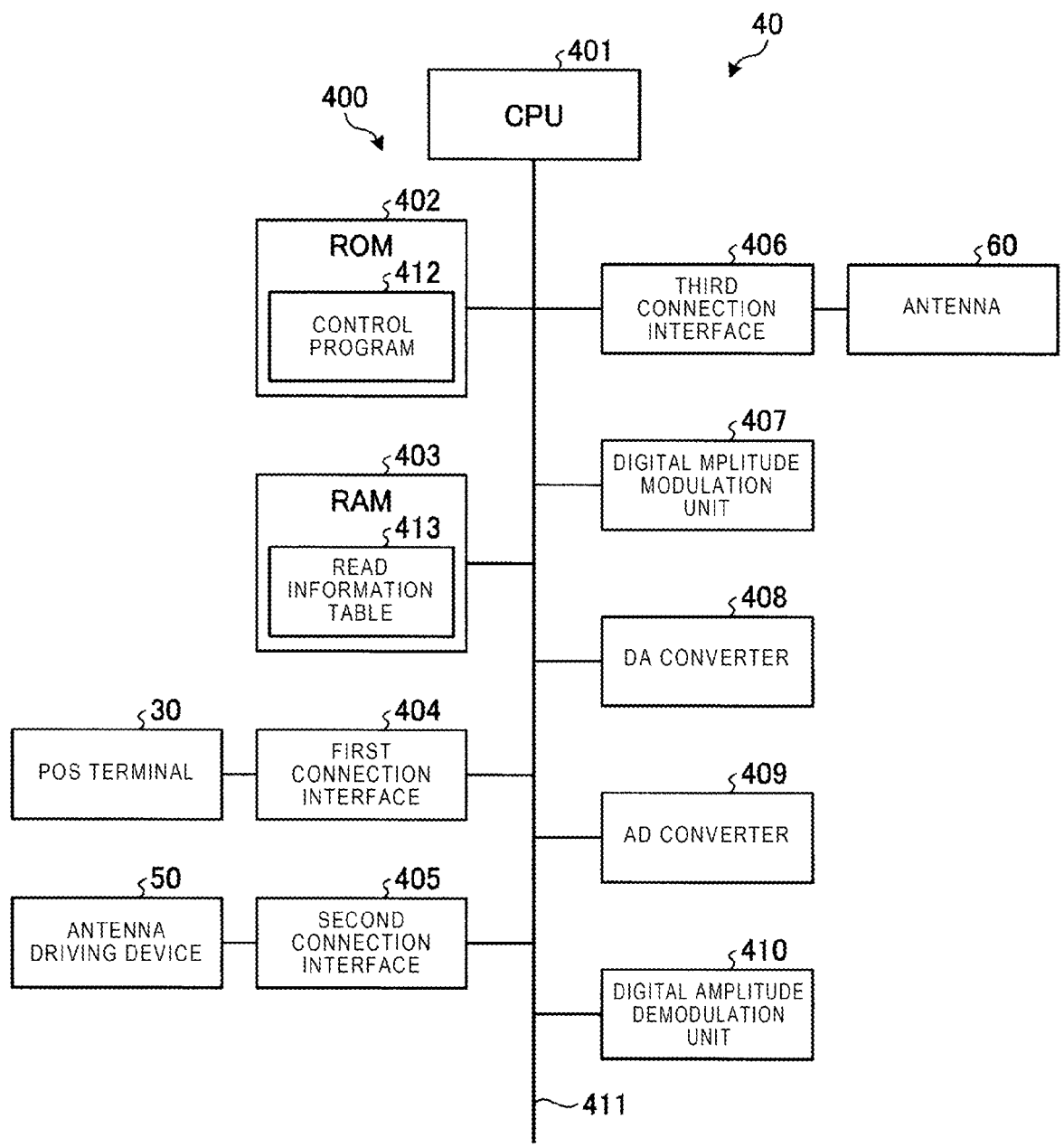
FIG. 5 is a block diagram illustrating an example of a hardware configuration of a wireless tag reading apparatus.

FIG. 5 is a block diagram illustrating an example of a hardware configuration of the wireless tag reading apparatus 40. The wireless tag reading apparatus 40 includes a control unit 400, a first connection interface 404, a second connection interface 405, a third connection interface 406, a digital amplitude modulation unit 407, a digital to analog (DA) converter 408, an Analog to Digital (AD) converter 409, and a digital amplitude demodulation unit 410. These units are interconnected through a system bus 411 such as a data bus, an address bus or the like.

The control unit 400 is a computer that controls the overall operation of the wireless tag reading apparatus 40 and implements various functions of the wireless tag reading apparatus 40. The control unit 400 includes a CPU 401, a ROM 402, and a RAM 403. The CPU 401 comprehensively controls the operation of the wireless tag reading apparatus 40.

The ROM 402 is a storage medium for storing various wireless tag reading methods and data. For example, The ROM 402 stores, a control wireless tag reading method 412. The control wireless tag reading method 412 is a wireless tag reading method for fulfilling the functions of the operating system and the wireless tag reading apparatus 40. The control wireless tag reading method 412 includes a wireless tag reading method for fulfilling characteristic functions according to an exemplary embodiment.

The RAM 403 is a storage medium for temporarily storing various wireless tag reading methods and various data. The CPU 401 then executes the wireless tag reading method stored in the ROM 402 or the like, while the RAM 403 serves as a work area.

Figures 6, 7:
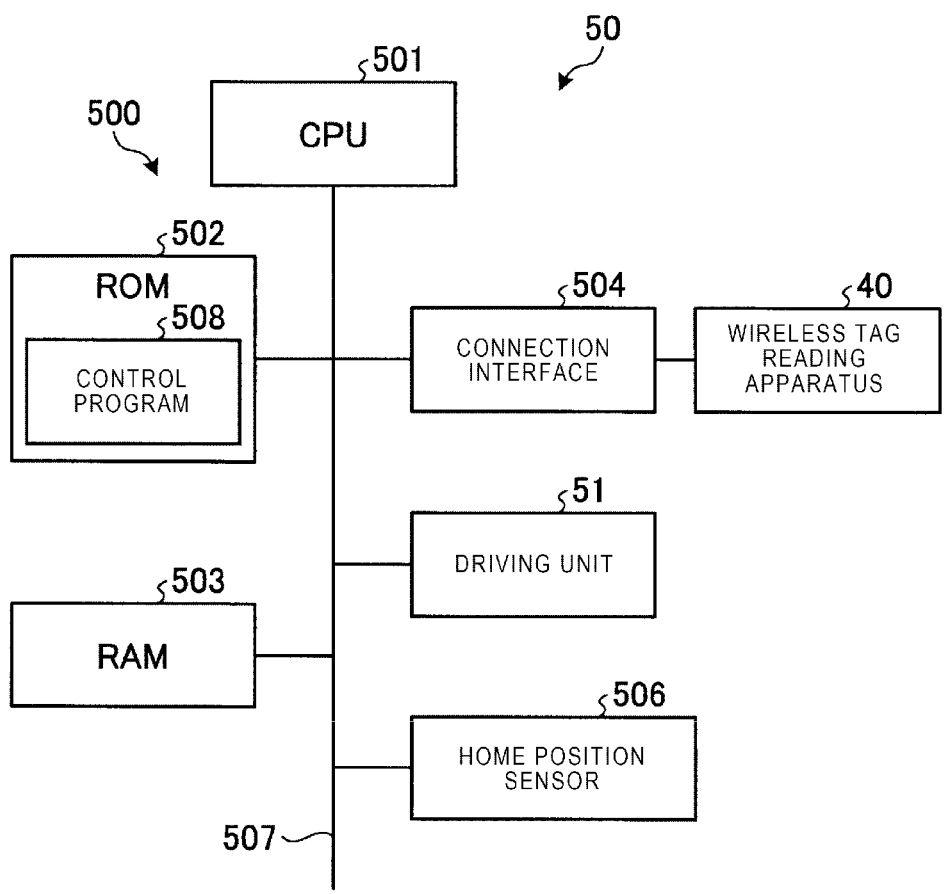
FIG. 6 is a diagram for explaining an example of a data configuration of a read information table.
FIG. 7 is a block diagram illustrating an example of a hardware configuration of an antenna driving device.

In addition, the RAM 403 stores the read information table 413, for example. Here, FIG. 6 is a diagram for explaining an example of a data configuration of the read information table 413. The read information table 413 is configured to store various kinds of information extracted from the radio wave transmitted by the wireless tag 20. The read information table 413 stores the commodity code, the position information, and the phase information in correlation with each other. The commodity code is information indicating the received commodity code. The position information is information indicating the reception position of the antenna 60 on the rail 53 when the commodity code is received from the wireless tag 20. The phase information indicates the phase of a radio wave carrying the received commodity code.

The first connection interface 404 is configured for communicating with the POS terminal 30. The second connection interface 405 is configured for communicating with the antenna driving device 50. The third connection interface 406 is a configured for communicating with the antenna 60.

The digital amplitude modulation unit 407 is, for example, a circuit that adds information to be transmitted to the wireless tag 20 to a carrier wave to be transmitted to the wireless tag 20.

The DA converter 408 is a circuit for converting a digital signal into an analog signal. The DA converter 408 converts the digital signal modulated by the digital amplitude modulation unit 407 into an analog signal. Then, the DA converter 408 outputs the analog signal to the antenna 60 through the third connection interface 406.

The AD converter 409 is a circuit for converting an analog signal into a digital signal. The AD converter 409 converts the analog signal output from the antenna 60 into a digital signal through the third connection interface 406.

The digital amplitude demodulation unit 410 is, for example, a circuit that extracts various information from the radio waves received from the wireless tag 20. For example, the digital amplitude demodulation unit 410 extracts tag information such as a commodity code included in the carrier wave from the digital signal converted at the AD converter 409. In addition, the digital amplitude demodulation unit 410 extracts the phase of the radio wave from the digital signal converted by the AD converter 409 by the quadrature amplitude demodulation method.

FIG. 7 is a block diagram illustrating an example of a hardware configuration of an antenna driving device 50. The antenna driving device 50 includes a control unit 500, a connection interface 504, a driving unit 51, and a home position sensor 506. These units are interconnected through a system bus 507 such as a data bus, an address bus, or the like.

The control unit 500 is a computer that controls the overall operation of the antenna driving device 50 and implements various functions of the antenna driving device 50. The control unit 500 includes a CPU 501, a ROM 502, and a RAM 503. The CPU 501 comprehensively controls the operation of the antenna driving device 50.

The ROM 502 is a storage medium for storing various wireless tag reading methods and data. For example, the ROM 502 stores, a control wireless tag reading method 508. The control wireless tag reading method 508 is a wireless tag reading method for fulfilling the function of the operating system and the antenna driving device 50. The control wireless tag reading method 508 includes a wireless tag reading method for fulfilling the characteristic functions according to an exemplary embodiment.

The RAM 503 is a storage medium for temporarily storing various wireless tag reading methods and various data. The CPU 501 executes the wireless tag reading method stored in the ROM 502 or the like, while the RAM 503 serves as a work area.

The connection interface 504 is configured for communicating with the wireless tag reading apparatus 40.

The home position sensor 506 is configured for detecting whether the moving stage 54 is at a predetermined position called a home position.

Next, the characteristic functions of various devices included in the commodity registration system 1 will be described. Here, FIG. 8 is a block diagram illustrating an example of a characteristic functional configuration of various devices provided in the commodity registration system 1.

Figure 8:
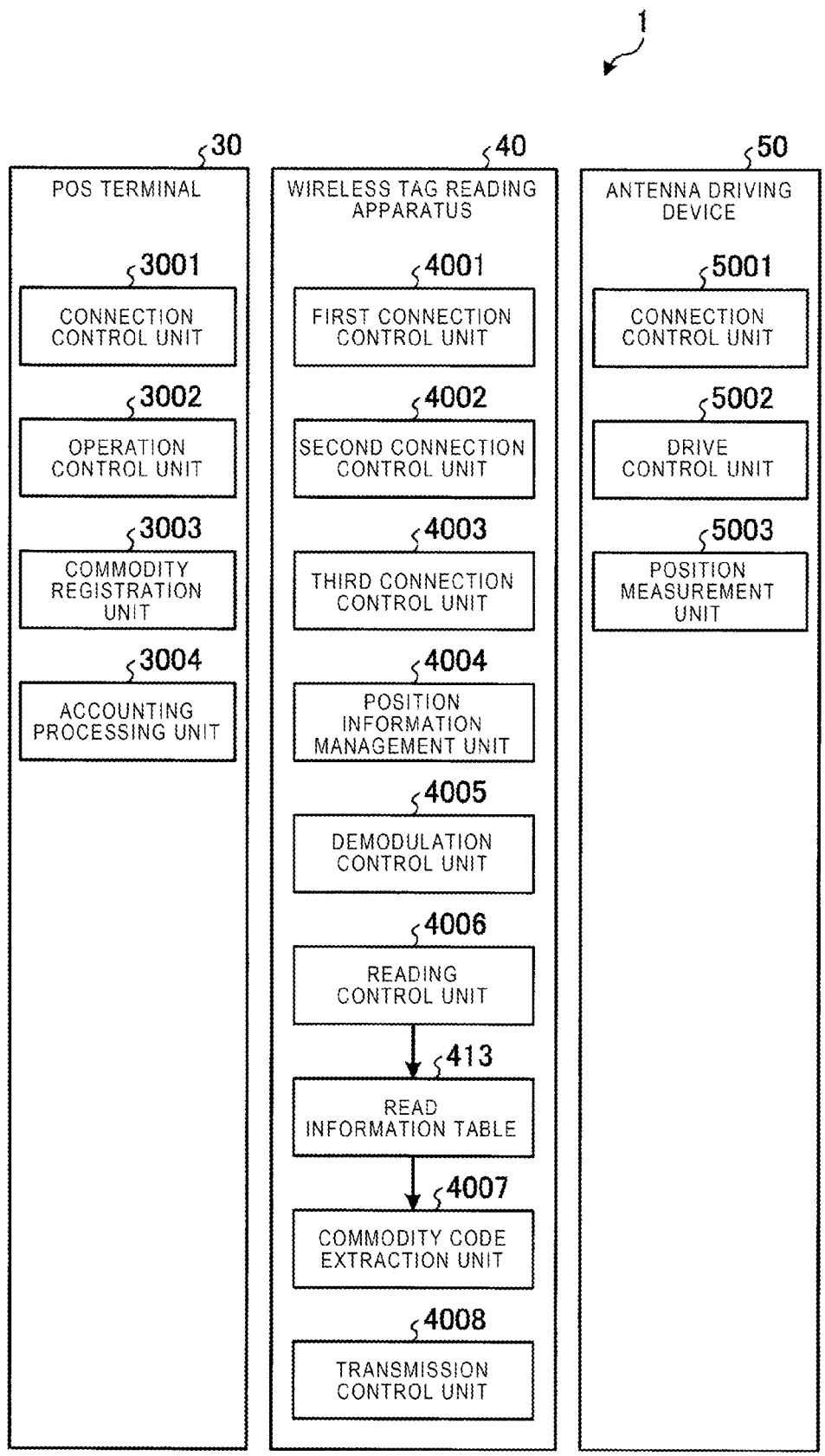
FIG. 8 is a block diagram illustrating an example of a characteristic functional configuration of various devices provided in a commodity registration system.

The control unit 500 of the antenna driving device 50 expands the control wireless tag reading method 508 of the ROM 502 to the RAM 503 and operates in accordance with the control wireless tag reading method 508 to generate each of the functionalities shown in FIG. 8 in the RAM 503. Specifically, the control unit 500 of the antenna driving device 50 includes a connection control unit 5001, a drive control unit 5002, and a position measurement unit 5003 as the functionalities.

The connection control unit 5001 controls the connection interface 504 to perform communication with the wireless tag reading apparatus 40. For example, the connection control unit 5001 receives a movement request for requesting a movement of the antenna 60 from the wireless tag reading apparatus 40. In addition, the connection control unit 5001 transmits position information indicating the current position of the antenna 60 to the wireless tag reading apparatus 40. In addition, the connection control unit 5001 transmits a movement completion notification indicating that the movement of the antenna 60 is completed to the wireless tag reading apparatus 40.

The drive control unit 5002 controls the driving unit 51 to move the moving stage 54. When the connection control unit 5001 receives the movement request for the antenna 60, the drive control unit 5002 moves the moving stage 54 by rotating the rotating shaft 52 of the driving unit 51. As a result, the drive control unit 5002 causes the antenna 60 to reciprocate one or more times along the rail 53. In addition, the amount of movement of the antenna 60 may be set in advance or may be notified each time from the wireless tag reading apparatus 40. When the movement of the antenna 60 is completed, the drive control unit 5002 causes the connection control unit 5001 to transmit the movement completion notification. In addition, the drive control unit 5002 may complete the movement of the moving stage 54 when receiving the movement completion notification from the wireless tag reading apparatus 40.

The position measurement unit 5003 measures the current position of the moving stage 54, that is, the current position of the antenna 60. Then, the position measurement unit 5003 transmits the position information indicating the current position of the antenna 60 to the wireless tag reading apparatus 40. The position measurement unit 5003 determines that antenna 60 is in the home position when the home position sensor 506 detects the moving stages 54. In addition, the drive control unit 5002 moves the moving stage 54 by rotating the rotating shaft 52 of the driving unit 51. Therefore, the position measurement unit 5003 measures the current position of the antenna 60 by measuring the rotation amount of the rotating shaft 52 from the home position.

The control unit 400 of the wireless tag reading apparatus 40 expands the control wireless tag reading method 412 of the ROM 402 to the RAM 403 and operates in accordance with the control wireless tag reading method 412 to generate each of the functionalities shown in FIG. 8 on the RAM 403. Specifically, the control unit 400 of the wireless tag reading apparatus 40 includes a first connection control unit 4001, a second connection control unit 4002, a third connection control unit 4003, a position information management unit 4004, a demodulation control unit 4005, a reading control unit 4006, a commodity code extraction unit 4007, and a transmission control unit 4008 as functionalities.

The first connection control unit 4001 controls the first connection interface 404 to perform communication with the POS terminal 30. For example, the first connection control unit 4001 receives a read request for the wireless tag 20 from the POS terminal 30. In addition, the first connection control unit 4001 transmits information such as a commodity code read from the wireless tag 20 to the POS terminal 30.

The second connection control unit 4002 controls the second connection interface 405 to perform communication with the antenna driving device 50. For example, the second connection control unit 4002 transmits a movement request for requesting movement of the antenna 60 to the antenna driving device 50. In addition, the second connection control unit 4002 receives position information indicating the current position of the antenna 60, and a movement completion notification indicating that the movement of the antenna 60 is completed.

The third connection control unit 4003 is an example of an input control unit. The third connection control unit 4003 controls the third connection interface 406 to perform communication with the antenna 60. For example, the third connection control unit 4003 receives the analog signal converted from the radio wave received by the antenna 60.

When the second connection control unit 4002 receives the position information, the position information management unit 4004 stores the position information in the RAM 403 or the like. In addition, when the second connection control unit 4002 receives the position information again, the position information management unit 4004 overwrites and stores the newly received position information. In this way, the position information management unit 4004 stores the position information indicating the current position of the antenna 60 in the RAM 403 or the like.

The demodulation control unit 4005 is an example of an extraction control unit. The demodulation control unit 4005 controls the digital amplitude demodulation unit 410 to extract various information from the analog signal which is output from the antenna 60 through the third connection control unit 4003. For example, the demodulation control unit 4005 causes the digital amplitude demodulation unit 410 to extract a commodity code. The demodulation control unit 4005 causes the digital amplitude demodulation unit 410 to extract the phase of the radio wave received by the antenna 60.

The reading control unit 4006 is an example of a storage control unit and a movement control unit. The reading control unit 4006 causes the moving stage 54 to move and to read the wireless tag 20. More specifically, when the first connection control unit 4001 receives the read request of the wireless tag 20, the reading control unit 4006 causes the second connection control unit 4002 to transmit a movement request for requesting the movement of the antenna 60. In addition, the reading control unit 4006 causes the antenna 60 to transmit the radio waves for reading the information stored in the storage medium of the wireless tag 20 through the third connection control unit 4003.

The reading control unit 4006 determines whether the commodity code is included in the information extracted by the demodulation control unit 4005. When the commodity code is included, the reading control unit 4006 stores, in the read information table 413, the commodity code extracted by the demodulation control unit 4005, the position information stored in the RAM 403 or the like by the position information management unit 4004, and the phase information indicating the phase of the radio wave extracted by the demodulation control unit 4005. As a result, the reading control unit 4006 stores, in the read information table 413, the received commodity code, the position information indicating the reception position of the antenna 60 when the antenna 60 receives the radio wave including the commodity code, and the phase information indicating the phase of the radio wave carrying the commodity code. When the second connection control unit 4002 receives the movement completion notification, the reading control unit 4006 completes the process described above.

The commodity code extraction unit 4007 is an example of a determination unit. The commodity code extraction unit 4007 extracts the commodity code read from the wireless tag 20 attached to the commodity 10 inside the predetermined region based on the various information stored in the read information table 413. More specifically, the commodity code extraction unit 4007 selects from the read information table 413 one commodity code to be determined. The commodity code extraction unit 4007 determines whether the selected commodity code is stored in the read information table 413 a plurality of times. That is, the commodity code extraction unit 4007 determines whether the selected commodity code is read a plurality of times. When the frequency of reading the selected commodity code is once, the commodity code extraction unit 4007 determines that the selected commodity code is the commodity code read from the wireless tag 20 located outside the predetermined region.

When the frequency of reading the selected commodity code is a plurality of times, the commodity code extraction unit 4007 determines whether an amount of change of the phase per displacement distance due to the displacement of the reception position is equal to or greater than a threshold value. Under a condition that the amount of change of the phase per displacement distance due to the displacement of the reception position is less than the threshold value, the commodity code extraction unit 4007 determines that the selected commodity code is the commodity code read from the wireless tag 20 located outside the predetermined region. On the other hand, under a condition that the amount of change of the phase per displacement distance due to the displacement of the reception position is equal to or greater than the threshold value, the commodity code extraction unit 4007 determines that the selected commodity code is the commodity code read from the wireless tag 20 located inside the predetermined region. Then, the commodity code extraction unit 4007 performs the process described above on all commodity codes stored in the read information table 413.

In addition, the commodity code extraction unit 4007 may add a determination criterion based on whether the amount of change of the phase indicates a predetermined state. For example, when the wireless tag 20 is inside the predetermined region, the distance from the antenna 60 to the wireless tag 20 gradually decreases as the antenna 60 starts to move along the rail 53. Then, when the antenna 60 passes under the wireless tag 20, the distance from the antenna 60 to the wireless tag 20 gradually increases. Therefore, for the same reason, when the wireless tag 20 is inside the predetermined region, the value indicated by the phase information stored in the read information table 413 also reverses when the antenna 60 passes under the wireless tag 20. Therefore, by adding the determination criterion that the value indicated by the phase information stored in the read information table 413 is also inverted, the wireless tag reading apparatus 40 can improve the accuracy of determining whether the wireless tag 20 is inside the predetermined region. In addition, in this case, the antenna 60 needs to move from one end to the other end of the predetermined region. Therefore, the rail 53 is preferably longer than the predetermined region. For example, the rail 53 is preferably longer than a horizontal length of the shopping basket 80.

The transmission control unit 4008 causes the first connection control unit 4001 to transmit one or more commodity codes extracted by the commodity code extraction unit 4007 to the POS terminal 30. That is, the transmission control unit 4008 causes the first connection control unit 4001 to transmit the commodity code read from the wireless tag 20 inside the predetermined region to the POS terminal 30.

The control unit 300 of the POS terminal 30 expands the control wireless tag reading method 314 of the storage unit 304 to the RAM 303 and operates in accordance with the control wireless tag reading method 314 to generate each of the functionalities shown in FIG. 8 on the RAM 303. Specifically, the control unit 300 of the POS terminal 30 includes a connection control unit 3001, an operation control unit 3002, a commodity registration unit 3003, and an accounting processing unit 3004 as the functionalities.

The connection control unit 3001 controls the connection interface 306 to perform communication with the wireless tag reading apparatus 40. For example, the connection control unit 3001 transmits a read request for the wireless tag 20 to the wireless tag reading apparatus 40. In addition, the connection control unit 3001 receives information such as a commodity code read by the wireless tag reading apparatus 40 from the wireless tag 20.

The operation control unit 3002 controls the keyboard 307 or the like to receive an input for operating the POS terminal 30. In addition, the operation control unit 3002 is not limited to the keyboard 307, and may receive an input for operating the POS terminal 30 through another input device. For example, the operation control unit 3002 receives, an operation to start commodity registration by the wireless tag reading apparatus 40.

The commodity registration unit 3003 controls sales registration of the commodity 10 to be sold. For example, when the operation control unit 3002 receives an operation to start commodity registration, the commodity registration unit 3003 causes the connection control unit 3001 to transmit a read request for requesting reading of the wireless tag 20. Then, when the connection control unit 3001 receives the commodity code, the commodity registration unit 3003 registers the commodity 10 specified by the received commodity code as the commodity 10 to be sold.

The accounting processing unit 3004 controls the accounting process of the commodity 10 registered as the commodity to be sold by the commodity registration unit 3003. For example, the accounting processing unit 3004 calculates the total price of the commodity 10 registered as the commodity to be sold by the commodity registration unit 3003. In addition, the accounting processing unit 3004 calculates the change by subtracting the total price from the amount received from the customer.

Figure 9:
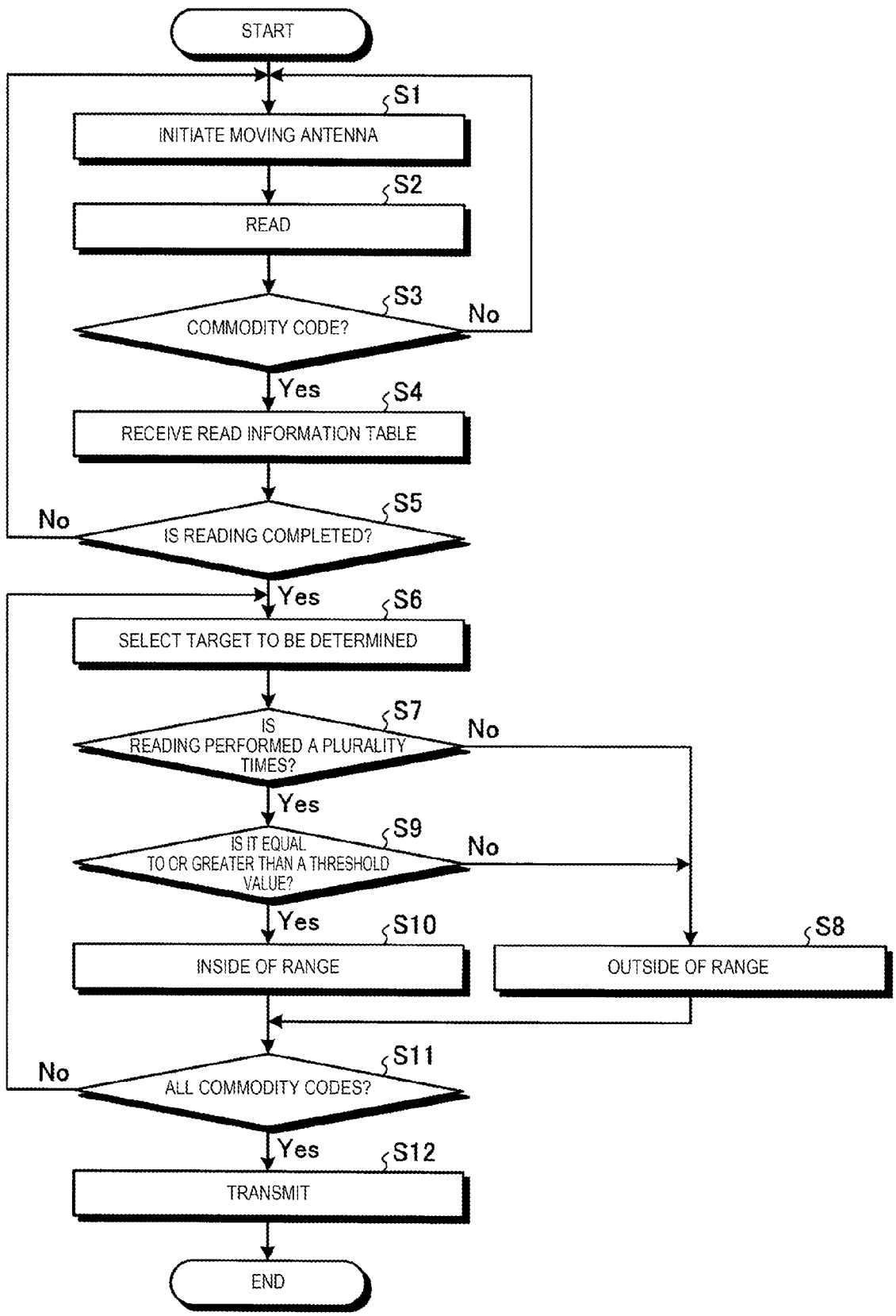
FIG. 9 is a flowchart illustrating an example of reading processing performed by a wireless tag reading apparatus according to an exemplary embodiment.

Next, the reading process performed by the wireless tag reading apparatus 40 will be described. Here, FIG. 9 is a flowchart illustrating an example of reading processing performed by the wireless tag reading apparatus 40 according to an exemplary embodiment.

The second connection control unit 4002 transmits a movement request for the antenna 60 to the antenna driving device 50 (Act 1). As a result, the drive control unit 5002 of the antenna driving device 50 starts to reciprocate the antenna 60 along the rail 53.

The reading control unit 4006 transmits a radio wave for reading the wireless tag 20 to the antenna 60 (Act 2). In addition, the reading control unit 4006 continues the transmission of a radio waves for reading the wireless tag 20 until the reciprocating movement of the antenna 60 is completed. Alternatively, the reading control unit 4006 periodically transmits a radio wave for reading the wireless tag 20 until the reciprocating movement of the antenna 60 is completed.

The reading control unit 4006 determines whether the wireless tag 20 is read (Act 3). That is, the reading control unit 4006 determines whether a commodity code is received.

Under a condition that the commodity code is not received (Act 3; No), the reading control unit 4006 proceeds to Act 1. Under a condition that the commodity code is received (Act 3; Yes), the reading control unit 4006 stores the commodity code, the phase information, and the position information in the read information table 413 (Act 4).

The reading control unit 4006 determines whether reading of the wireless tag 20 is completed (Act 5). That is, the reading control unit 4006 determines whether the second connection control unit 4002 stops the transmission of the radio waves for reading the wireless tag 20 upon receiving the movement completion notification for the antenna 60. Under a condition that reading of the wireless tag 20 is not completed (Act 5; No), the reading control unit 4006 proceeds to Act 1.

Under a condition that reading of the wireless tag 20 is completed (Act 5; Yes), the commodity code extraction unit 4007 selects one commodity code to be determined from the read information table 413 (Act 6).

The commodity code extraction unit 4007 determines whether the selected commodity code is read a plurality of times (Act 7). When the frequency of reading the selected commodity code is once (Act 7; No), the commodity code extraction unit 4007 determines that the selected commodity code is read from the wireless tag 20 located outside the predetermined region (Act 8).

Under a condition that the frequency of reading the selected commodity code is a plurality of times (Act 7; Yes), the commodity code extraction unit 4007 determines whether the amount of change of the phase per displacement distance due to the displacement of the reception position of the commodity code is equal to or greater than a threshold value (Act 9).

Under a condition that the amount of change of the phase is less than the threshold value (Act 9; No), the commodity code extraction unit 4007 proceeds to Act 8.

Under a condition that the amount of change of the phase is equal to or greater than the threshold value (Act 9; Yes), the commodity code extraction unit 4007 determines that the selected commodity code is the commodity code read from the wireless tag 20 inside the predetermined region (Act 10).

The commodity code extraction unit 4007 determines whether a determination is performed for all of the commodity codes registered in the read information table 413 as to whether the wireless tag is inside the predetermined region (Act 11). Under a condition that determination is not performed for all the commodity codes (Act 11; No), the commodity code extraction unit 4007 proceeds to Act 6.

Under a condition that determination is performed for all the commodity codes to determine availability for registration (Act 11; Yes), the first connection control unit 4001 transmits the commodity code read from the wireless tag 20 inside the predetermined region to the POS terminal 30 (Act 12).

As described above, the wireless tag reading apparatus 40 completes the reading process.

As described above, with the commodity registration system 1 according to the first embodiment, when the antenna 60 receives a radio wave, the wireless tag reading apparatus 40 receives an input of an analog signal obtained by converting the radio wave. The wireless tag reading apparatus 40 extracts the phase of the radio wave received by the antenna 60 from the input analog signal. In addition, when the antenna 60 receives a radio wave from the wireless tag 20, the wireless tag reading apparatus 40 stores the received commodity code, the phase information indicating the phase of the received the radio wave, and the position information indicating the reception position at which the antenna 60 received the radio wave in association with each other in the read information table 413. Then, under a condition that the amount of change of each phase information stored in the read information table 413 is equal to or greater than a threshold value defined according to the moving distance of the antenna 60, the wireless tag reading apparatus 40 determines whether the wireless tag 20 that transmits the radio wave is inside a predetermined region. As described above, the wireless tag reading apparatus 40 determines whether the wireless tag 20 that transmits the radio wave is inside the predetermined region, so that it is possible to determine whether information such as the commodity code carried by the radio wave is information read from the wireless tag 20 which is inside the predetermined region.

Second Embodiment

Next, a second embodiment will be described. Further, the differences from the first embodiment will be mainly described and components including functions similar to those of the first embodiment are denoted by the same names and reference numerals as those in the first embodiment, and description thereof will not be repeated.

Figure 10:
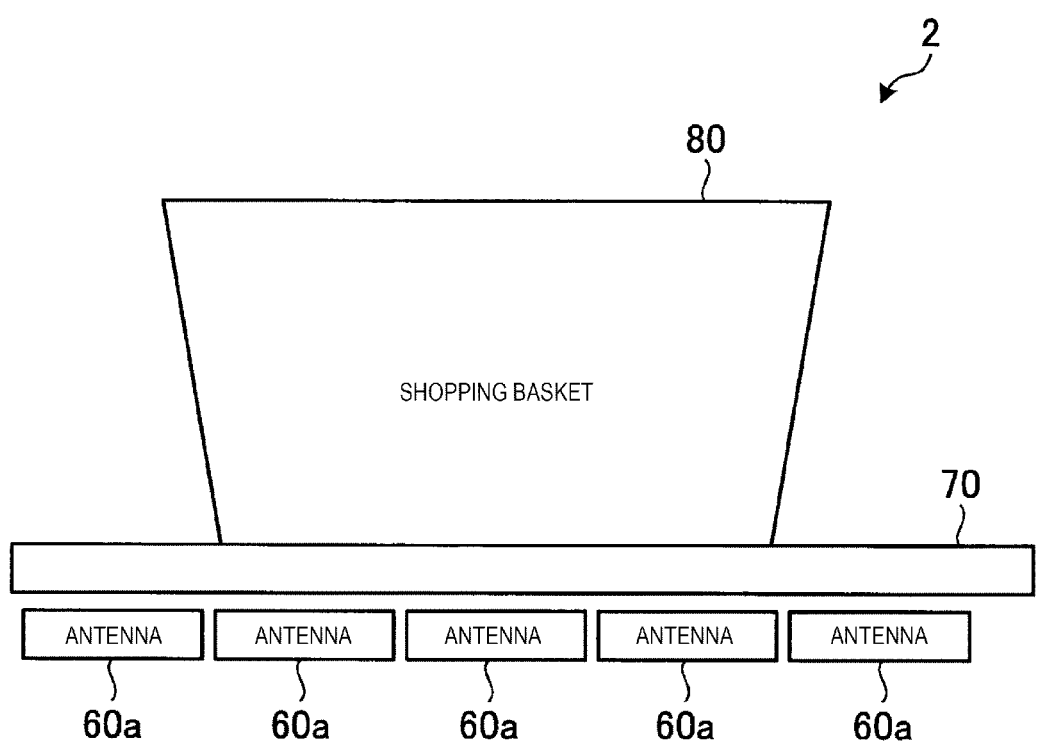
FIG. 10 is a diagram for explaining a commodity registration system according to a second embodiment.
Figure 11:
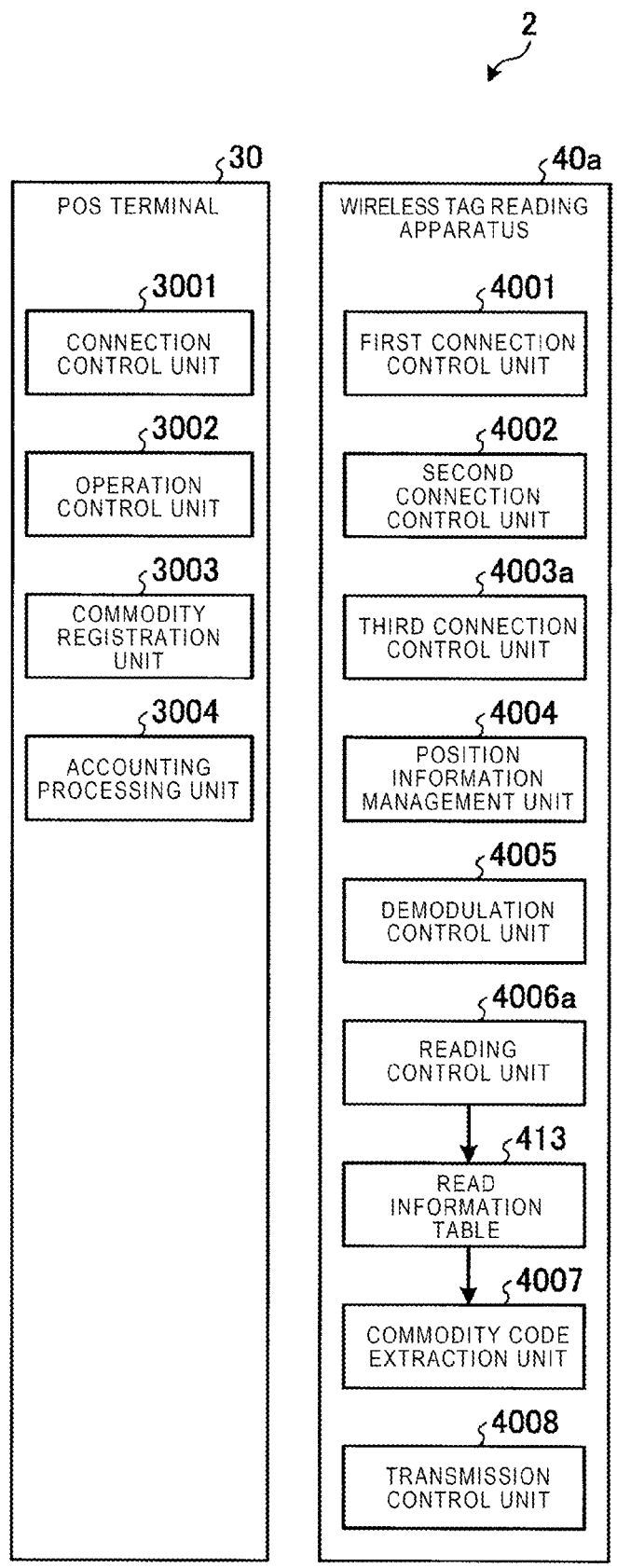
FIG. 11 is a block diagram illustrating an example of a characteristic functional configuration of various devices provided in the commodity registration system according to the second embodiment.

Here, FIG. 10 is a diagram for explaining a commodity registration system 2 according to the second embodiment. FIG. 11 is a block diagram illustrating an example of a characteristic functional configuration of various devices provided in the commodity registration system 2 according to the second embodiment. The commodity registration system 2 according to the second embodiment is different from the first embodiment in that it does not include the antenna driving device 50, but includes a plurality of antennas 60a. In the first embodiment, the wireless tag reading apparatus 40 reads the wireless tag 20 from a plurality of reception positions and generates read information by moving the antenna 60 with the antenna driving device 50. Then, the wireless tag reading apparatus 40 determines whether the read commodity code is information read from the wireless tag 20 inside the predetermined region based on the read information.

The wireless tag reading apparatus 40a according to the second embodiment includes a plurality of antennas 60a. Therefore, the third connection control unit 4003a performs communication with the plurality of antennas 60a. The reading control unit 4006a causes the plurality of antennas 60a to sequentially transmit the radio waves for reading the wireless tag 20. In addition, when each antenna 60a receives the commodity code, the reading control unit 4006a stores the commodity code in the read information table 413. Then, the commodity code extraction unit 4007 extracts the commodity code read from the wireless tag 20 inside the predetermined region by the same method as the method according to the first embodiment. In addition, while five antennas 60a are shown in FIG. 10, the number of antennas 60a may be two or more.

As described above, according to the commodity registration system 2 of the second embodiment, the wireless tag reading apparatus 40a includes a plurality of antennas 60a. Therefore, the wireless tag reading apparatus 40a does not need the antenna driving device 50 for moving the antenna 60a.

Third Embodiment

Next, a third embodiment will be described. Further, the differences from the first embodiment will be mainly described and components including functions similar to those of the first embodiment are denoted by the same names and reference numerals as those in the first embodiment, and description thereof will not be repeated.

Figure 12:
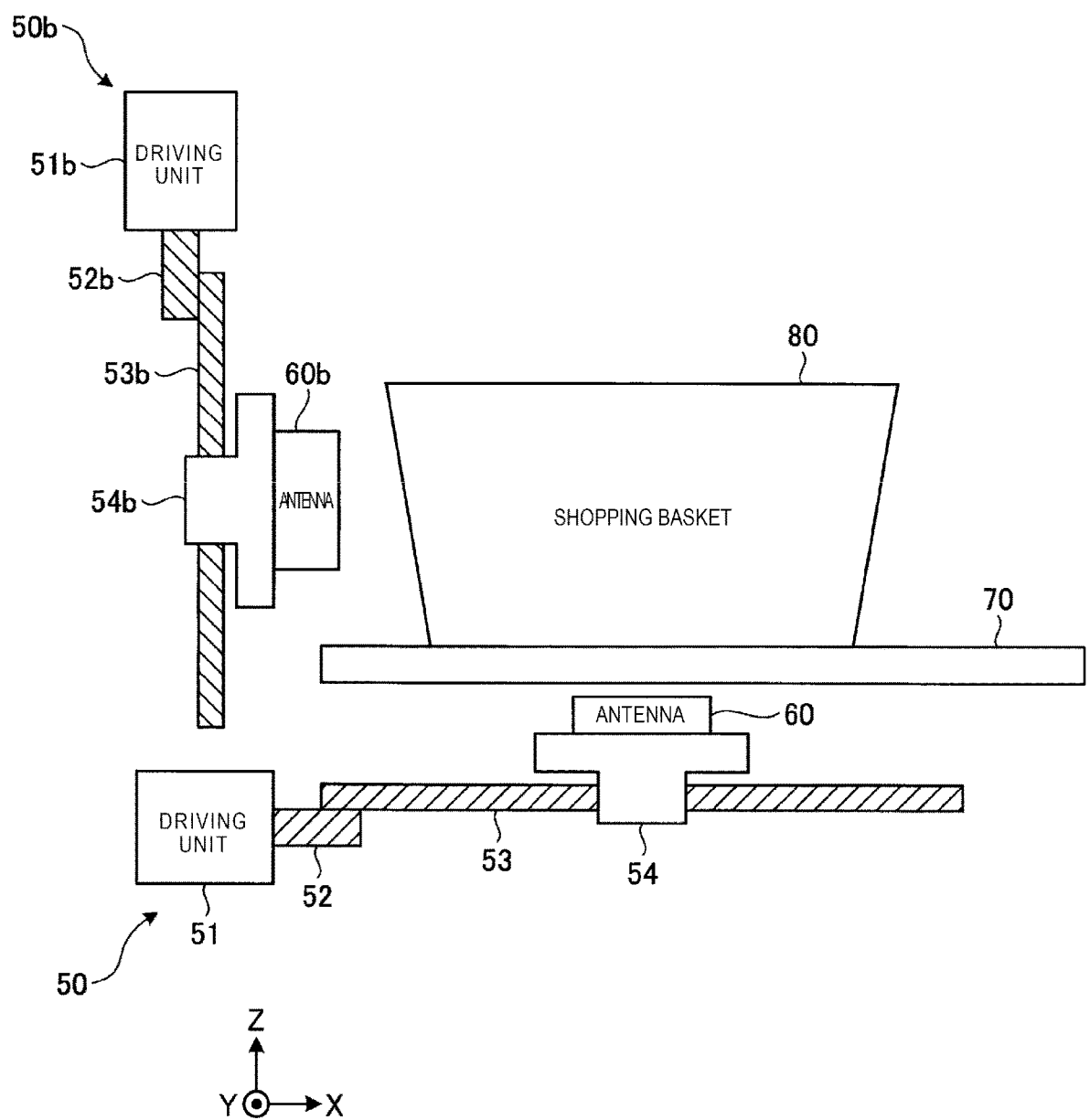
FIG. 12 is a diagram for explaining a commodity registration system according to a third embodiment.
Figure 13:
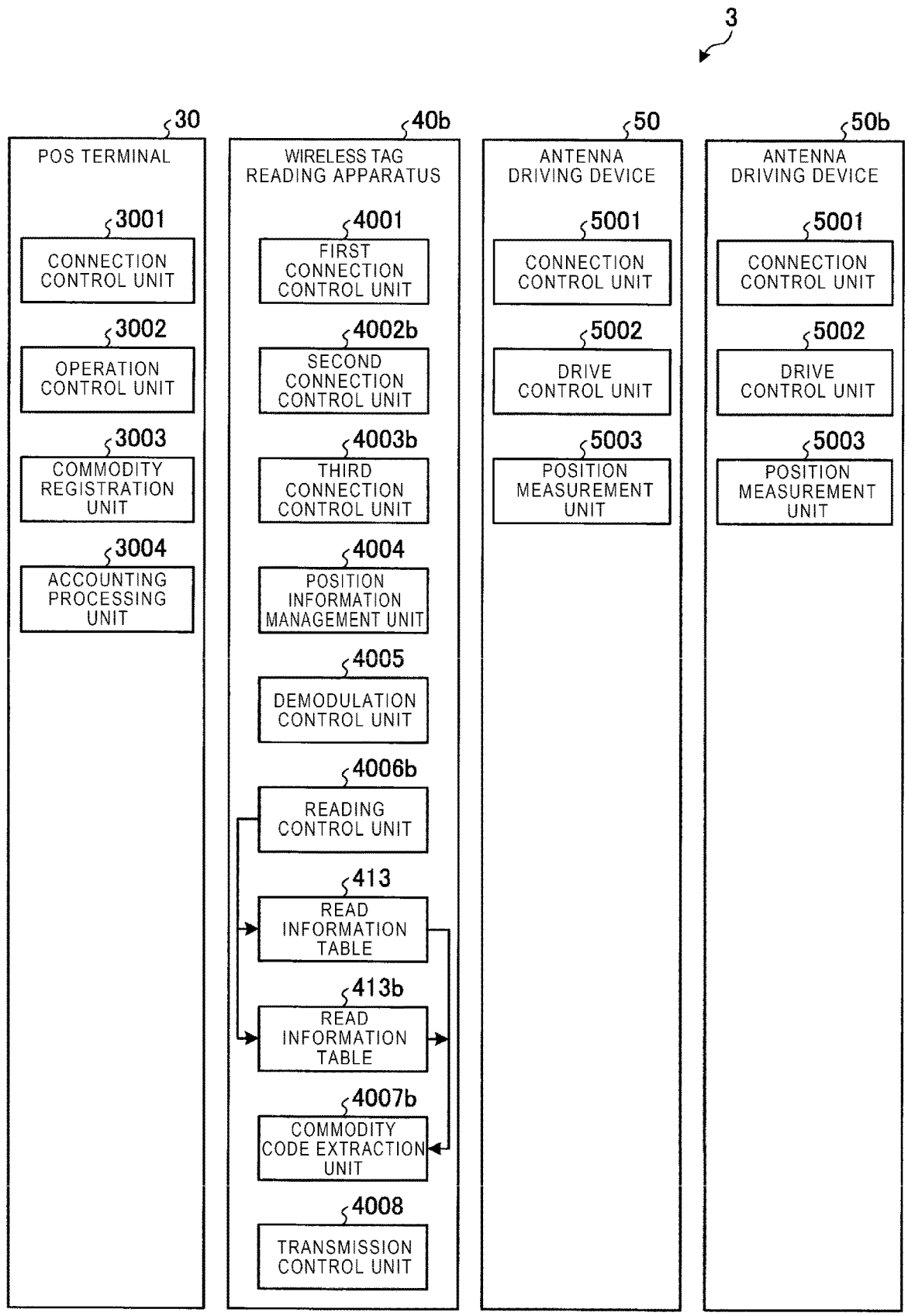
FIG. 13 is a block diagram illustrating an example of a characteristic functional configuration of various devices provided in the commodity registration system according to the third embodiment.

Here, FIG. 12 is a diagram for explaining a commodity registration system 3 according to the third embodiment. FIG. 13 is a block diagram illustrating an example of a characteristic functional configuration of various devices provided in the commodity registration system 3 according to the third embodiment. The commodity registration system 3 according to the third embodiment is different from the first embodiment in that it includes an antenna 60b that moves in the vertical direction and an antenna driving device 50b that moves the antenna 60b in the vertical direction.

The antenna driving device 50b according to the third embodiment includes a driving unit 51b, a rotating shaft 52b, a rail 53b, and a moving stage 54b. The antenna driving device 50b with the same configuration as the antenna driving device 50 reciprocates the antenna 60b one or more times in the vertical direction. That is, the moving stage 54b is moved in a Z-axis direction as shown in FIG. 12.

The second connection control unit 4002b performs communication with the antenna driving device 50 and the antenna driving device 50b. In addition, the third connection control unit 4003b performs communication with the antenna 60 and the antenna 60b.

When receiving the read request for the wireless tag 20 from the POS terminal 30, the reading control unit 4006b causes the antenna driving device 50 to start moving the antenna 60 and causes the antenna driving device 50b to start moving the antenna 60b. For example, the reading control unit 4006b causes the antenna 60 to transmit and receive the radio waves for reading the wireless tag 20. Then, when the antenna 60 receives the commodity code from the wireless tag 20, the reading control unit 4006b stores the read information in the read information table 413. After reading the wireless tag 20 by the antenna 60, the wireless tag reading apparatus 40b causes the antenna 60b to transmit and receive the radio waves for reading the wireless tag 20. Then, when the antenna 60b receives the commodity code from the wireless tag 20, the wireless tag reading apparatus 40b stores the read information in the read information table 413b. In addition, the reading control unit 4006b may perform reading by the antenna 60b before reading the wireless tag 20 by the antenna 60.

The commodity code extraction unit 4007b determines whether the commodity code is read from the wireless tag 20 inside the predetermined region for each of the read information table 413 and the read information table 413b. Then, the wireless tag reading apparatus 40b determines that the commodity codes extracted by both the read information table 413 and the read information table 413b are the commodity codes read from the wireless tag 20 inside the predetermined region.

Then, the transmission control unit 4008 transmits the commodity code designated to be transmitted to the POS terminal 30. In addition, the wireless tag reading apparatus 40b may determine the commodity code extracted by at least one of the read information table 413 and the read information table 413b as the commodity code read from the wireless tag 20 inside the predetermined region.

As described above, according to the commodity registration system 3 of the third embodiment, the wireless tag reading apparatus 40b includes an antenna driving device 50 for moving the antenna 60 in the horizontal direction and an antenna driving device 50b for moving the antenna 60b in the vertical direction. When the antenna 60 reads the wireless tag 20, the wireless tag reading apparatus 40b stores the wireless tag 20 in the read information table 413, and when the antenna 60b reads the wireless tag 20, the wireless tag reading apparatus 40b stores the wireless tag 20 in the read information table 413b. The wireless tag reading apparatus 40b determines that the wireless tag 20 that transmits the radio wave is inside the predetermined region under a condition that both the read information table 413 and the read information table 413b determine that the amount of change of the phase per displacement distance due to the displacement of the reception position is equal to or greater than the threshold value. Therefore, compared with the wireless tag reading apparatus 40 according to the first embodiment, the wireless tag reading apparatus 40b according to the third embodiment can improve the accuracy of determining whether the wireless tag 20 that transmits the radio wave is inside the predetermined region.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiments described above, the functional configuration of each device has been described with reference to FIGS. 8, 11, and 13. However, the functional configuration described in FIGS. 8, 11, and 13 is an example only, and each functional configuration can be optionally changed. For example, the commodity code extraction units 4007 and 4007b may be included in the POS terminal 30. In this case, the wireless tag reading apparatuses 40 and 40b transmit the read information tables 413 and 413b to the POS terminal 30. Then, the POS terminal 30 may determine whether the wireless tag 20 that transmits the radio wave is inside the predetermined region based on the read information tables 413 and 413b. Further, the drive control unit 5002 and the position measurement unit 5003 may be provided in the wireless tag reading apparatus 40 and 40b.

The wireless tag reading method executed in the respective apparatuses of the embodiments and modifications described above is assumed to be embedded in advance in the storage medium (ROM or storage unit) provided in the respective apparatuses, but not limited thereto. For example, it may be configured to be recorded and provided on a computer-readable recording medium such as a CD-ROM, a flexible disk (FD), a CD-R, or a digital versatile disk (DVD) with a file in installable or executable format. Furthermore, the storage medium is not limited to a medium independent of the computer or the embedded system, but also includes a storage medium that downloads and stores or temporarily stores the wireless tag reading method transmitted by the LAN, the Internet or the like.

The wireless tag reading method executed in the respective apparatuses of the embodiments and modifications may be stored on a computer connected to a network such as the Internet to be provided by being downloaded through the network, and may be provided or distributed through a network such as the Internet.

What is claimed is:

1. A wireless tag reading apparatus comprising:
an input control unit for receiving an input of a signal converted from a radio wave received by an antenna which receives the radio wave from a wireless tag;
an extraction unit for extracting a phase of the radio wave received by the antenna, from the signal received by the input control unit;
a storage control unit for causing a storage medium to store the phase of the radio wave extracted by the extraction unit for each reception position at which the antenna receives the radio wave; and
a determination unit for determining whether the wireless tag that transmits the radio wave is inside a predetermined region based on an amount of change of the phase stored in the storage medium.

2. The apparatus according to claim 1, further comprising a movement control unit for controlling a driving unit that moves the antenna, wherein the storage control unit causes the storage medium to store the phase for each reception position to which the antenna moves.

3. The apparatus according to claim 1,
wherein the input control unit receives the input of the signal from each of a plurality of the antennas, and
wherein the storage control unit causes the storage medium to store the phase for each reception position received by each of a plurality of the antennas.

4. The apparatus according to claim 2,
wherein the input control unit receives the input of the signal from each of a plurality of the antennas,
wherein the movement control unit controls the movement of each of a plurality of the antennas from which the input control unit receives the signal, and
wherein the storage control unit causes the storage medium to store the phase for each reception position at which each of the antennas receives the radio wave.

5. The apparatus according to claim 1,
wherein the determination unit determines that the wireless tag transmitting the radio wave is inside the predetermined region, under a condition that the amount of change of the phase per displacement distance due to displacement of the reception position is equal to or greater than a threshold value.

6. The apparatus according to claim 2, wherein the movement control unit controls the driving unit to move the antenna for a distance set in advance.

7. The apparatus according to claim 2, wherein the movement control unit controls the driving unit to move the antenna as the antenna is notified each time in a control loop.

8. The apparatus according to claim 1, wherein the extraction unit includes a determination criterion based on whether the amount of change of the phase indicates a predetermined state.

9. A wireless tag reading method comprising:
receiving a signal obtained by converting an antenna radio wave received by an antenna that receives a tag radio wave transmitted from a wireless tag;
extracting, from the signal, a phase of the antenna radio wave at a reception position;
storing, at a storage medium, two or more phases of the antenna radio wave respectively extracted at two or more reception positions at which the antenna receives the tag radio wave; and
determining whether the wireless tag transmitting the tag radio wave is inside a predetermined region based on an amount of change of the two or more phases stored in the storage medium.

10. The wireless tag reading method of claim 9, further comprising reciprocating the antenna between two positions for the antenna to reach the two or more reception positions.

11. The wireless tag reading method of claim 10, wherein reciprocating the antenna between the two positions is controlled by an antenna driving device having a connection control unit, a drive control unit, and a position measurement unit.

12. The wireless tag reading method of claim 11, wherein the two or more reception positions are set in advance or provided by the connection control unit transmitting a movement completion notification caused by the drive control unit.

13. A system for reading a wireless tag, the system comprising:
at least one driving device actuating an antenna to move between two different positions;
a wireless tag reading apparatus connected to the antenna, the wireless tag reading apparatus operable to process signals received in the antenna to:
identify product information related to the signals received in the antenna;

evaluate a signal strength level associated with the identified product information and a related position information recorded in the driving device; and determine, based on the signal strength level, one or more of the identified product information to be physically within a predetermined region.

14. The system of claim 13, further comprises two driving devices each actuating an antenna in directions perpendicular to each other.

15. The system of claim 13, wherein the predetermine region is a shopping basket placed on a checkout table.

16. The system of claim 13, wherein the driving device includes a rail, a threaded rotating shaft, and a screw nut connected to a moving stage.

17. The system of claim 13, wherein the wireless tag reading apparatus identifies product information from a read information table.

18. The system of claim 17, wherein the signal strength level is greater or equal to a threshold level when a corresponding wireless tag is within the predetermined region and is less than the threshold level when a corresponding wireless tag is outside the predetermined region yet whose antenna is nonetheless received by the antenna.

19. The system of claim 18, wherein the wireless tag reading apparatus determines a phase difference between signals received and processed when the antenna is actuated to be at different locations.

20. The system of claim 19, wherein the phase difference between signals indicates a predetermined state based on phase information saved in the read information table.

* * * * *